(12) United States Patent  (10) Patent No.: US 12,428,070 B2
Suzuki  (45) Date of Patent: Sep. 30, 2025

(54) BODY FOR VEHICLE, AND BATTERY ELECTRIC VEHICLE

(71) Applicant: TOYOTA JIDOSHA KABUSHIKI KAISHA, Toyota (JP)

(72) Inventor: Takuya Suzuki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 18/204,456

(22) Filed: Jun. 1, 2023

(65) Prior Publication Data

US 2023/0391407 A1   Dec. 7, 2023

(30) Foreign Application Priority Data

Jun. 6, 2022 (JP) .................................. 2022-091775

(51) Int. Cl.
*B62D 25/08* (2006.01)
*B60L 50/60* (2019.01)
*B60L 53/16* (2019.01)

(52) U.S. Cl.
CPC ............ *B62D 25/082* (2013.01); *B60L 50/66* (2019.02); *B60L 53/16* (2019.02)

(58) Field of Classification Search
CPC .................................................. B62D 25/082
USPC ............... 296/193.09, 187.09, 187.1, 203.02
See application file for complete search history.

(56) References Cited

U.S. PATENT DOCUMENTS

| 6,612,644 | B2* | 9/2003 | Ahn ...................... | B62D 25/082 296/29 |
| 8,118,349 | B2* | 2/2012 | Kihara ................. | B62D 25/082 296/203.02 |
| 8,276,976 | B2* | 10/2012 | Yasuhara ............. | B62D 21/152 296/203.02 |
| 8,596,711 | B2* | 12/2013 | Yasui ................... | B62D 25/082 296/187.1 |
| 9,387,883 | B2* | 7/2016 | Hirota .................. | B62D 25/082 |
| 10,870,451 | B2* | 12/2020 | Kondo .................. | B62D 25/08 |
| 10,926,807 | B2* | 2/2021 | Viaux .................. | B62D 25/082 |
| 11,072,372 | B2* | 7/2021 | Enoki .................. | B62D 25/082 |

(Continued)

FOREIGN PATENT DOCUMENTS

EP   2070805 A1   6/2009
EP   3632778 A1   4/2020

(Continued)

*Primary Examiner* — Jason S Morrow
(74) *Attorney, Agent, or Firm* — Dinsmore & Shohl LLP

(57) ABSTRACT

A body for a vehicle includes an upper member. The upper member has an internal space between a first plate and a second plate, and the internal space extends in a longitudinal direction of the upper member. The first plate includes an upper wall portion, an inner wall portion, and a first flange extending along a lower end of the inner wall portion. The second plate includes a lower wall portion, an outer wall portion, and a second flange extending along an inner end of the lower wall portion and joined to the first flange. In a first section in the longitudinal direction of the upper member, the first flange and the second flange protrude in a first direction. In a second section in the longitudinal direction of the upper member, the first flange and the second flange protrude in a second direction different from the first direction.

8 Claims, 3 Drawing Sheets

(56) References Cited

U.S. PATENT DOCUMENTS

| | | | |
|---|---|---|---|
| 2009/0146455 A1* | 6/2009 | Honji | B62D 25/082 |
| | | | 296/187.09 |
| 2014/0239671 A1* | 8/2014 | Mori | B62D 21/152 |
| | | | 296/187.09 |
| 2015/0151792 A1* | 6/2015 | Mori | B62D 21/152 |
| | | | 296/187.09 |
| 2015/0175208 A1* | 6/2015 | Kuwayama | B62D 21/02 |
| | | | 296/187.09 |
| 2015/0183468 A1* | 7/2015 | Shirooka | B62D 21/155 |
| | | | 296/187.1 |
| 2020/0391804 A1 | 12/2020 | Haga et al. | |
| 2023/0391178 A1* | 12/2023 | Yang | B62D 21/02 |

FOREIGN PATENT DOCUMENTS

| | | |
|---|---|---|
| JP | 2019-098917 A | 6/2019 |
| JP | 2020-199929 A | 12/2020 |

* cited by examiner

BODY FOR VEHICLE, AND BATTERY ELECTRIC VEHICLE

CROSS-REFERENCE TO RELATED APPLICATION

This application claims priority to Japanese Patent Application No. 2022-091775 filed on Jun. 6, 2022, incorporated herein by reference in its entirety.

BACKGROUND

1. Technical Field

The technique disclosed in the present specification relates to bodies for vehicles that include upper members extending from front pillars, over front wheels, to in front of the front wheels, and battery electric vehicles that include the body. Battery electric vehicles include rechargeable vehicles that are charged by an external power supply, and hybrid electric vehicles that also have an engine.

2. Description of Related Art

An upper member described in Japanese Unexamined Patent Application Publication No. 2020-199929 (JP 2020-199929 A) has a hollow rectangular section perpendicular to its axis, and is composed of an upper member outer (plate) located on the outer side in the vehicle width direction and an upper member inner (plate) located on the inner side in the vehicle width direction.

SUMMARY

There are cases where components are placed in a space below a lower wall portion of the upper member. The arrangement of components is affected by the internal configuration of an automobile etc. In particular, the space required to place components on the side closer to a front pillar is sometimes different from the space required to place components on the side farther away from the front pillar.

The present specification provides a technique for appropriately placing components in a space below a lower wall portion of an upper member.

A body for a vehicle according to a first aspect of the present disclosure as disclosed in the present specification includes: a front pillar located behind a front wheel of the vehicle and extending in an up-down direction; and an upper member extending from the front pillar, over the front wheel, to in front of the front wheel. The upper member includes a first plate and a second plate joined to the first plate, and the first plate and the second plate define an internal space extending in a longitudinal direction of the upper member. The first plate includes an upper wall portion facing the internal space from above, an inner wall portion facing the internal space from an inner side in a vehicle width direction, and a first flange extending along a lower end of the inner wall portion. The second plate includes a lower wall portion facing the internal space from below, an outer wall portion facing the internal space from an outer side in the vehicle width direction, and a second flange extending along an inner end of the lower wall portion and joined to the first flange. In a first section in the longitudinal direction of the upper member, the first flange and the second flange protrude in a first direction from a connection between the inner wall portion and the lower wall portion. In a second section in the longitudinal direction of the upper member, the first flange and the second flange protrude in a second direction from a connection between the inner wall portion and the lower wall portion, and the second direction is different from the first direction.

According to the above configuration, both the first flange and the second flange protrude in the first direction in the first section, and protrude in the second direction different from the first direction in the second section. That is, at the space below the lower wall portion of the upper member, the space in the first section extends in a direction different from that in which the space in the second section extends. When the space required to place components in the first section is different from the space required to place components in the second section, components can be appropriately placed below the lower wall portion of the upper member by switching the direction in which the first flange and the second flange protrude.

In the body according to the above aspect, the first section may be located behind the second section, and the first direction may be such a direction that the first flange and the second flange are displaced outward in the vehicle width direction as the first flange and the second flange get farther away from the connection in the first section.

According to the above configuration, a space extending toward the outer side of the vehicle can be secured in the first section.

The body according to the above aspect may further include a suspension tower connected to the first section of the upper member.

The suspension swings not only toward the inner side of the vehicle, but also toward the outer side of the vehicle. According to the above configuration, the space in which the suspension swings can be extended toward the outer side of the vehicle.

In the body according to the above aspect, the second direction may be such a direction that the first flange and the second flange are displaced inward as the first flange and the second flange get farther away from the connection in the second section.

According to the above configuration, a space extending toward the inner side of the vehicle can be secured in the second section.

In the body according to the above aspect, distal ends of the first flange and the second flange in the second section at a side of the first section may be provided with a cut.

The present specification further discloses a battery electric vehicle. A battery electric vehicle according to a second aspect of the present disclosure includes: the body; a charging port that is fixed to the body and to which an external charger is detachably connected; a battery that is fixed to the body and that is charged with electric power supplied from the charger; and an electrical cable electrically connecting the charging port and the battery. The electrical cable is located along the lower wall portion of the upper member from the first section to the second section, and is routed toward an inner side of the vehicle in the second section.

According to the above configuration, the electrical cable can be appropriately routed in the space below the lower wall portion of the upper member.

Details and further improvements of the technique disclosed in the present specification will be described in the section "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
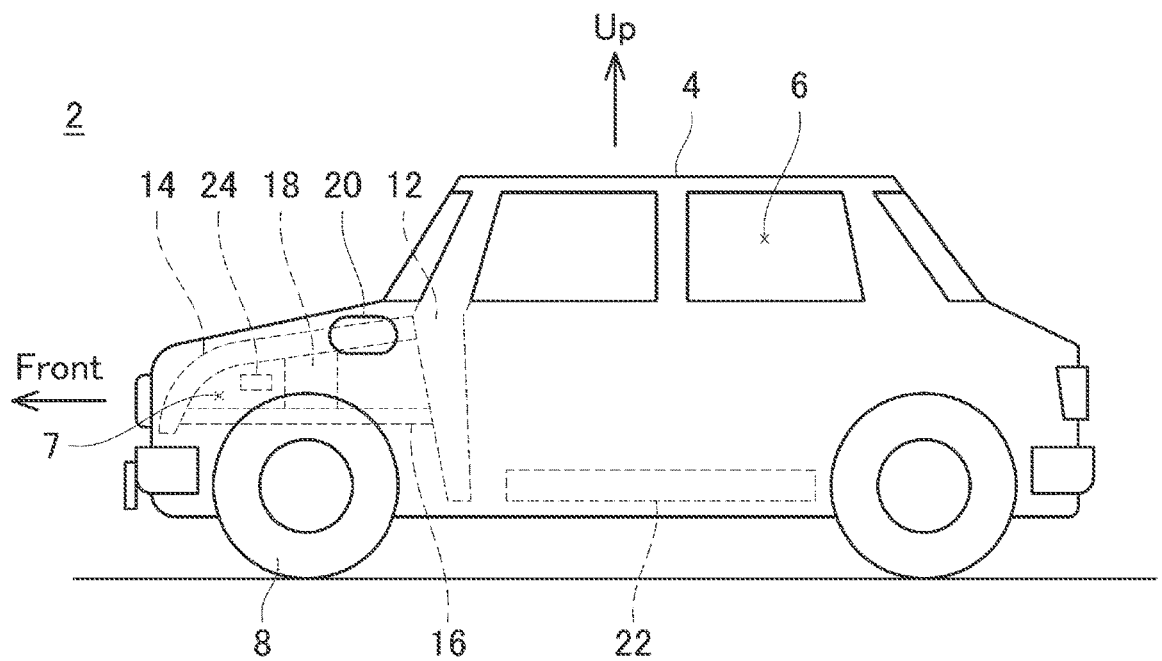
FIG. 1 is a schematic diagram of a battery electric vehicle.
Figure 2:
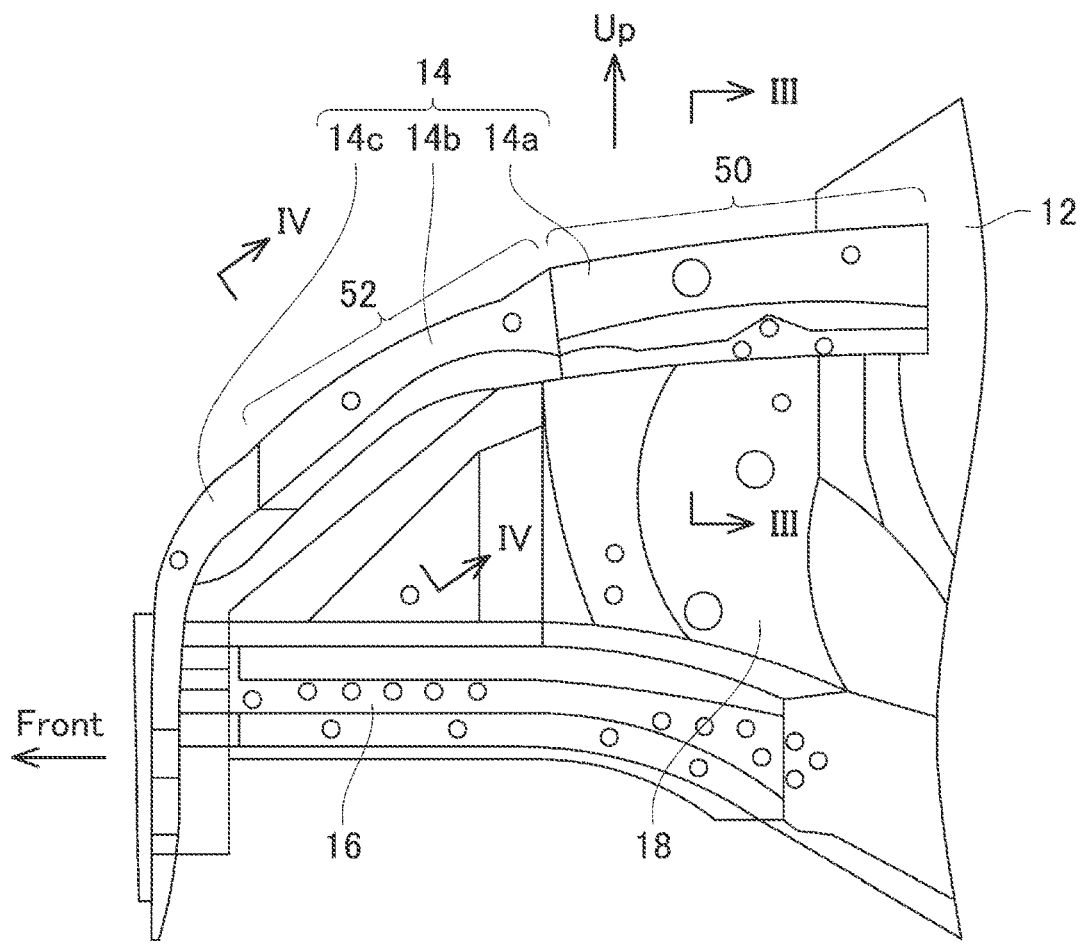
FIG. 2 is a side view of components around an upper member.

Configuration of Battery Electric Vehicle 2; FIG. 1

A battery electric vehicle 2 includes a body 4, front wheels 8, rear wheels (signs omitted), a charging port 20, a battery 22, and a power converter 24. In FIG. 1, arrow "Front" indicates the forward direction in the longitudinal direction of the vehicle. Arrow "Up" indicates the upward direction of the vehicle. The meanings of the arrows are the same in the subsequent drawings as well.

The battery 22 supplies electric power to a traction motor (not shown) mounted on the battery electric vehicle 2. The battery 22 is, for example, a lithium-ion battery and is a rechargeable power supply.

An external charger (not shown) is detachably connected to the charging port 20. When the charger is connected to the charging port 20, electric power is supplied from the charger to the battery 22. The battery 22 is thus charged.

The power converter 24 converts the electric power from the charger to electric power suitable for charging the battery 22. An input terminal of the power converter 24 is connected to the charging port 20 via an input-side electrical cable 70 (not shown in FIG. 1, see FIGS. 3 and 4). An output terminal of the power converter 24 is connected to the battery 22 via an output-side electrical cable (not shown). The charging port 20 is electrically connected to the battery 22 via the input-side electrical cable 70, the power converter 24, and the output-side electrical cable.

The body 4 is made of, but not particularly limited to, metal. There is a cabin 6 (i.e., a passenger compartment and a cargo compartment) inside the body 4. The body 4 includes front pillars 12, upper members 14, front side members 16, and suspension towers 18. These members 12 to 18 form the frame of the body 4 and are disposed on both right and left sides of the vehicle.

The front pillar 12 defines the front boundary of the cabin 6. The front pillar 12 is located behind the front wheel 8 and extends in the up-down direction. The upper member 14 defines the upper boundary of a front compartment 7 of the vehicle. The upper member 14 extends from the front pillar 12, over the front wheel 8, to in front of the front wheel 8. The front side member 16 defines the lower boundary of the front compartment 7. The suspension tower 18 supports a suspension (not shown) of the front wheel 8. An upper end of the suspension tower 18 is fixed to the upper member 14, and a lower end of the suspension tower 18 is fixed to the front side member 16.

The charging port 20 is fixed to the upper member 14. The battery 22 is fixed to the body 4 at the bottom of the cabin 6. The power converter 24 is located in the front compartment 7 and is fixed to the front side member 16.

Structure of Upper Member 14; FIGS. 2 to 5

The upper member 14 is composed of a first member 14a, a second member 14b, and a third member 14c. A rear end of the first member 14a is joined to the front pillar 12. A front end of the first member 14a is joined to a rear end of the second member 14b. The second member 14b extends obliquely downward from the first member 14a. A front end of the second member 14b is joined to a rear end of the third member 14c. The third member 14c extends downward from the second member 14b. A front end of the third member 14c is joined to a bumper reinforcement (not shown). In a modification, the upper member 14 may not be divided into the plurality of members 14a to 14c, and may be a single member.

Figure 3:
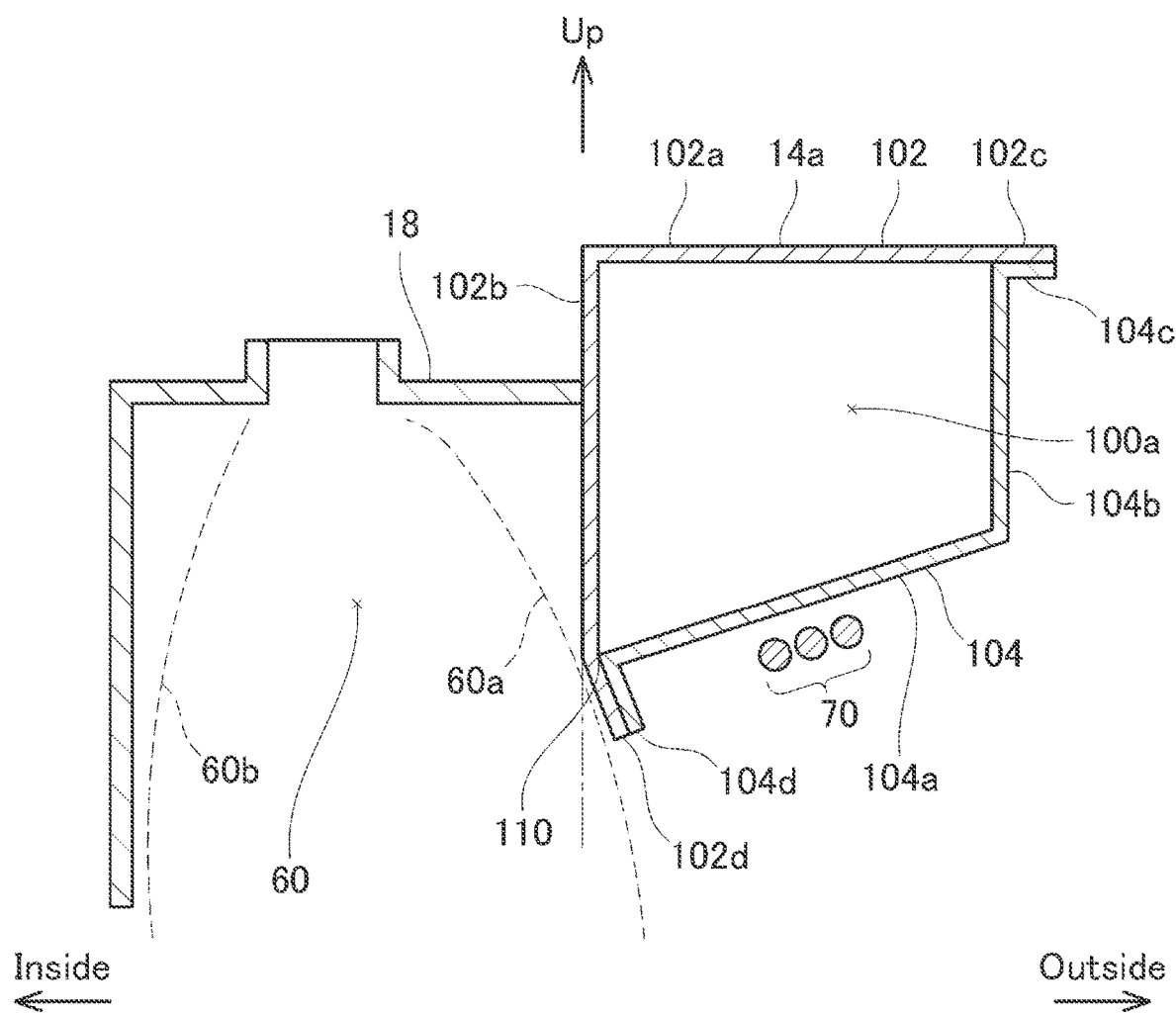
FIG. 3 is a cross-sectional view taken along line III-III in FIG. 2.

Configuration of First Member 14a; FIG. 3

As shown in FIG. 3, the first member 14a is composed of a first plate 102 and a second plate 104. The second plate 104 is joined to the first plate 102. An internal space 100a extending in the longitudinal direction of the first member 14a is formed between the first plate 102 and the second plate 104.

The first plate 102 has an upper wall portion 102a facing the internal space 100a from above, and an inner wall portion 102b facing the internal space 100a from the inner side in the vehicle width direction. The first plate 102 further has an upper end flange 102c formed along an upper end of the upper wall portion 102a, and a lower end flange 102d formed along a lower end of the inner wall portion 102b. In FIG. 3, arrow "Inside" indicates the inward direction in the vehicle width direction. Arrow "Outside" indicates the outward direction in the vehicle width direction. The meanings of the arrows are the same in the subsequent drawings as well.

The second plate 104 has a lower wall portion 104a facing the internal space 100a from below, and an outer wall portion 104b facing the internal space 100a from the outer side in the vehicle width direction. The second plate 104 further has an upper end flange 104c formed along an upper end of the outer wall portion 104b, and a lower end flange 104d formed along an inner end of the lower wall portion 104a.

The upper end flange 102c of the first plate 102 is joined to the upper end flange 104c of the second plate 104. For example, the upper end flange 102c is welded to the upper end flange 104c. The lower end flange 102d of the first plate 102 is joined to the lower end flange 104d of the second plate 104. For example, the lower end flange 102d is welded to the lower end flange 104d.

The upper end flanges 102c, 104c protrude in the outward direction. The lower end flanges 102d, 104d protrude in a downward and outward direction. In other words, the lower end flanges 102d, 104d protrude from a connection 110 between the inner wall portion 102b and the lower wall portion 104a, and the direction in which the lower end flanges 102d, 104d protrude is such a direction that the lower end flanges 102d, 104d are displaced outward in the vehicle width direction as they get farther away from the connection 110. That is, the direction in which the lower end flanges 102d, 104d protrude is an outward direction with respect to the inner wall portion 102b.

The suspension tower 18 is connected to the inner wall portion 102b of the first plate 102. The suspension (not shown) swings in an internal space 60 of the suspension tower 18. In FIG. 3, a dashed line 60a indicates the outer end of the swing range of the suspension, and a dashed line 60b indicates the inner end of the swing range of the suspension. As shown in FIG. 3, the lower end flange 102d and the lower end flange 104d protrude in the downward and outward direction. This allows the swing range not only to extend in the internal space 60 of the suspension tower 18 but also to be extended to the space below the upper member 14.

The electrical cable 70 extending from the charging port 20 is located along the lower wall portion 104a of the first member 14a. The electrical cable 70 is routed forward. As shown in FIG. 3, the electrical cable 70 is composed of three cables, namely two power cables and one signal cable. The number of cables forming the electrical cable 70 is not limited to three.

Figure 4:
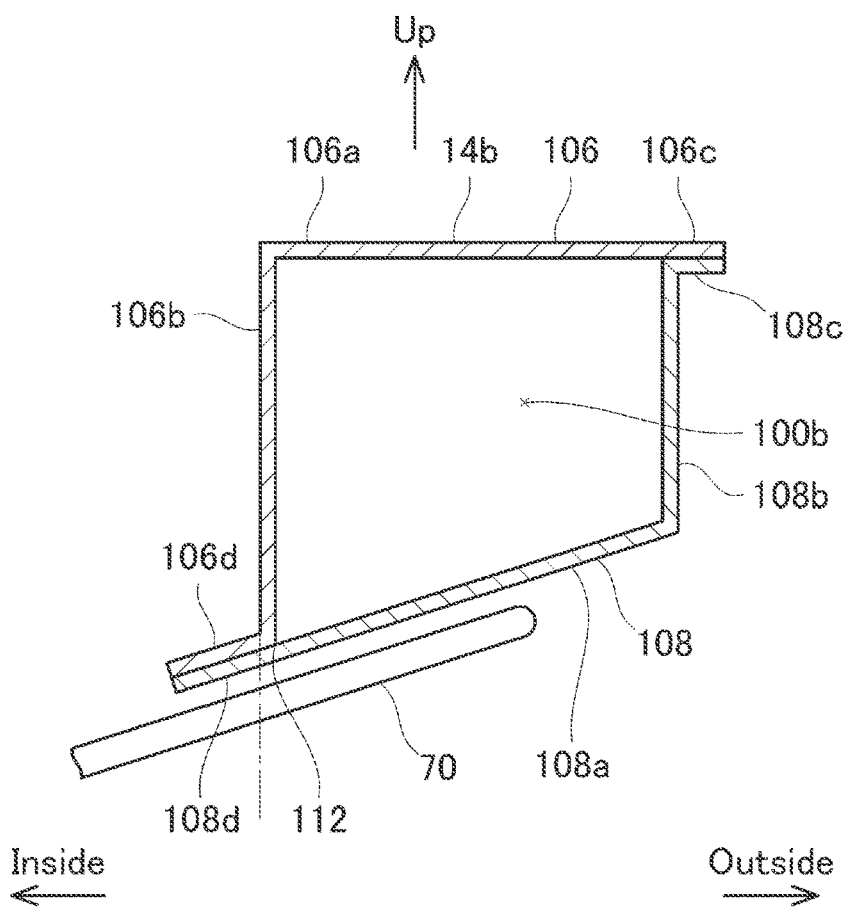
FIG. 4 is a cross-sectional view taken along line IV-IV in FIG. 2.

Configuration of Second Member 14b; FIG. 4

As shown in FIG. 4, the second member 14b is also composed of a first plate 106 and a second plate 108. An internal space 100b extending in the longitudinal direction of the second member 14b is formed between the first plate 106 and the second plate 108. The internal space 100b of the second member 14b communicates with the internal space 100a of the first member 14a.

Like the first plate 102, the first plate 106 also has an upper wall portion 106a and an inner wall portion 106b. Like the second plate 104, the second plate 108 also has a lower wall portion 108a and an outer wall portion 108b.

An upper end flange 106c of the first plate 106 is joined to an upper end flange 108c of the second plate 108. A lower end flange 106d of the first plate 106 is joined to a lower end flange 108d of the second plate 108.

The upper end flanges 106c, 108c protrude in the outward direction. The lower end flanges 106d, 108d protrude in a downward and inward direction. In other words, the lower end flanges 106d, 108d protrude from a connection 112 between the inner wall portion 106b and the lower wall portion 108a, and the direction in which the lower end flanges 106d, 108d protrude is such a direction that the lower end flanges 106d, 108d are displaced inward as they get farther away from the connection 112. That is, the direction in which the lower end flanges 106d, 108d protrude is an inward direction with respect to the inner wall portion 106b.

The direction in which the lower end flanges 106d, 108d of the second member 14b protrude is different from the direction in which the lower end flanges 102d, 104d of the first member 14a protrude.

The electrical cable 70 is placed along the lower wall portions 104a, 108a of the upper member 14 from a first section 50 (see FIG. 2) where the first member 14a is located to a second section 52 (see FIG. 2) where the second member 14b is located. The electrical cable 70 is routed inward in the second section 52 and is connected to the power converter 24 in the front compartment 7.

Figure 5:
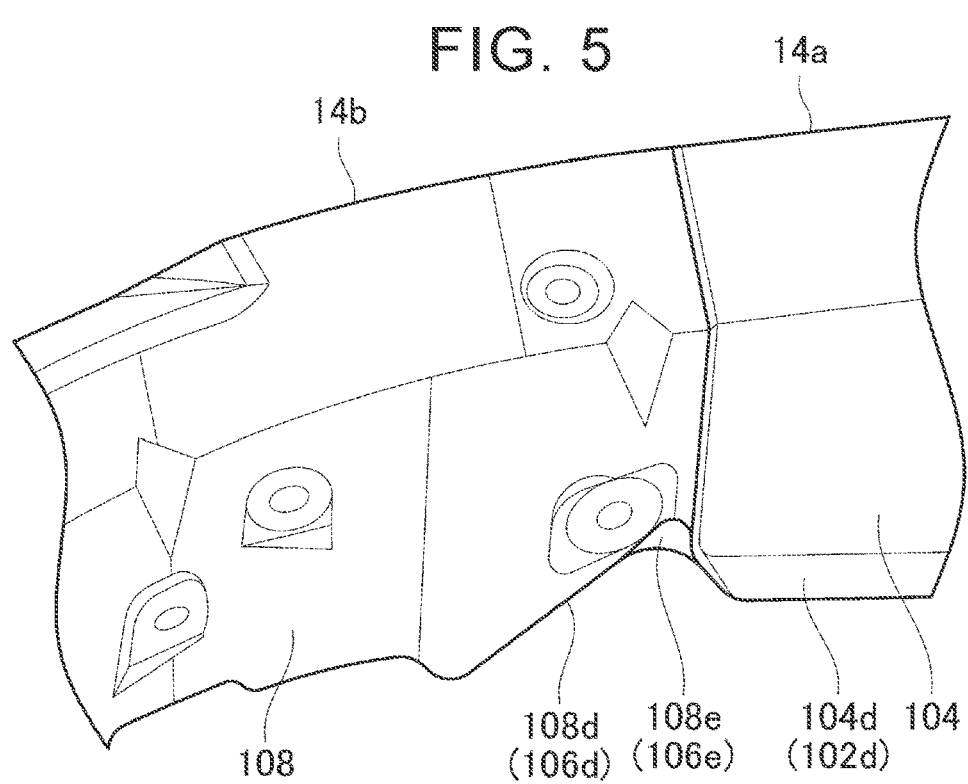
FIG. 5 is a perspective view of the upper member as viewed from below.

Connection Between First Member 14a and Second Member 14b; FIG. 5

The rear end of the second member 14b is inserted into the front end of the first member 14a. The distal ends of the lower end flanges 106d, 108d of the second member 14b have cuts 106e, 108e. As described above, the lower end flanges 102d, 104d of the first member 14a protrude in a direction different from the direction in which the lower end flanges 106d, 108d of the second member 14b protrude. The cuts 106e, 108e allow the rear end of the second member 14b to be inserted into the front end of the first member 14a while avoiding the bending curve of the lower end flanges 102d, 104d of the first member 14a that protrude in the different direction.

The upper member 14 buckles in the event of a full-wrap frontal collision or an offset frontal collision. As the upper member 14 buckles, the upper member 14 absorbs the load that would otherwise have been transmitted to the cabin 6. However, if the buckling position of the upper member 14 is not stable, the upper member 14 may not properly perform its function to absorb the load.

The portions of the lower end flanges 106d, 108d that have the cuts 106e, 108e are brittle portions of the upper member 14. In the event of a collision, the portions of the lower end flanges 106d, 108d that have the cuts 106e, 108e therefore serve as a starting point of the buckling of the upper member 14. The buckling position of the upper member 14 is thus stable, so that the upper member 14 can properly perform its function to absorb the load.

The cuts 106e, 108e serve not only to avoid the bending curve of the lower end flanges 102d, 104d of the first member 14a, but also to stabilize the buckling position of the upper member 14.

Effects of Embodiment

According to the configuration of the present embodiment, the lower end flanges (i.e., 102d, 104d, 106d, and 108d) of the upper member 14 protrude in the downward and outward direction in the first section 50, but protrude in the downward and inward direction in the second section 52. That is, below the lower wall portion (i.e., 104a and 108a) of the upper member 14, the space in the first section 50 extends in a direction different from that in which the space in the second section 52 extends. As described above, the electrical cable 70 is routed forward in the first section 50 but is routed inward in the second section 52. In such a case, the electrical cable 70 can be appropriately placed in the space below the lower wall portion of the upper member 14 by switching the direction in which the lower end flanges protrude.

In the second section 52, the space between the second member 14b and the front wheel 8 is narrow as the second member 14b is tilted downward. In the second section 52, not only the electrical cable 70 but also other components (e.g., a cable for a headlight (not shown)) are placed. Since the lower end flanges protrude in the downward and inward direction in the second section 52, the space in the second section 52 can be extended inward to secure the space for various components including the electrical cable 70.

Correspondence

The battery electric vehicle 2, the body 4, the front pillar 12, the upper member 14, the suspension tower 18, the charging port 20, the battery 22, and the electrical cable 70 are examples of the "battery electric vehicle," "body," "front pillar," "upper member," "suspension tower," "charging port," "battery," and "electrical cable," respectively. The first plates 102, 106 are examples of the "first plate." The second plates 104, 108 are examples of the "second plate." The internal spaces 100a, 100b are examples of the "internal space." The upper wall portions 102a, 106a and the inner wall portions 102b, 106b are examples of the "upper wall portion" and "inner wall portion," respectively. The lower wall portions 104a, 108a and the outer wall portions 104b, 108b are examples of the "lower wall portion" and "outer wall portion," respectively. The lower end flanges 102d, 106d and the lower end flanges 104d, 108d are examples of the "first flange" and "second flange," respectively. The connections 110, 112 are examples of the "connection." The first section 50 and the second section 52 are examples of the "first section" and "second section," respectively. The downward and outward direction and the downward and inward direction are examples of the "first direction" and "second direction," respectively.

Points to be noted regarding the technique described in the embodiment will be described. The charging port 20 may be fixed to a member different from the upper member 14

(e.g., the front pillar 12). Generally speaking, the "charging port" need only be fixed to the "body."

The lower end flanges 102d, 104d in the first section 50 may protrude in a direction different from the downward and outward direction (e.g., downward and inward direction). The lower end flanges 106d, 108d in the second section 52 may protrude in a direction different from the downward and inward direction (e.g., downward and outward direction). Generally speaking, the "second direction" may be any direction as long as it is different from the "first direction."

The components placed in the space below the lower wall portions 104a, 108a of the upper member 14 may be components different from the suspension or the electrical cable 70. In this modification, the "electrical cable" can be omitted.

The outer end 60a of the swing range of the suspension may not be extended to the space below the lower wall portion 104a of the upper member 14. For example, the lower end flanges 102d, 104d may protrude in a downward direction parallel to the inner wall portion 102b or in a downward and inward direction in order to place many components in the space below the lower wall portion 104a.

The technique disclosed in the present specification may be applied not only to the battery electric vehicle 2 but also to, for example, engine vehicles that are driven by an engine.

Although the specific examples of the present disclosure are described in detail above, these are merely illustrative and are not intended to limit the scope of the claims. The technique described in the claims includes various modifications and alterations of the specific examples illustrated above. The technical elements illustrated in the present specification or the drawings exhibit technical utility alone or in various combinations, and are not limited to the combinations set forth in the claims as originally filed. The technique illustrated in the present specification or the drawings may achieve a plurality of objects at the same time, and has technical utility by achieving one of the objects.

What is claimed is:

1. A body for a vehicle, the body comprising:
a front pillar located behind a front wheel of the vehicle and extending in an up-down direction; and
an upper member extending from the front pillar, over the front wheel, to in front of the front wheel, wherein
the upper member includes a first plate and a second plate joined to the first plate, the first plate and the second plate defining an internal space extending in a longitudinal direction of the upper member,
the first plate includes an upper wall portion facing the internal space from above, an inner wall portion facing the internal space from an inner side in a vehicle width direction, and a first flange extending along a lower end of the inner wall portion,
the second plate includes a lower wall portion facing the internal space from below, an outer wall portion facing the internal space from an outer side in the vehicle width direction, and a second flange extending along an inner end of the lower wall portion and joined to the first flange,
in a first section in the longitudinal direction of the upper member, the first flange and the second flange protrude in a first direction from a connection between the inner wall portion and the lower wall portion, and
in a second section in the longitudinal direction of the upper member, the first flange and the second flange protrude in a second direction from a connection between the inner wall portion and the lower wall portion, the second direction being different from the first direction.

2. The body according to claim 1, wherein:
the first section is located behind the second section; and
the first direction is such a direction that the first flange and the second flange are displaced outward in the vehicle width direction as the first flange and the second flange get farther away from the connection in the first section.

3. The body according to claim 2, further comprising a suspension tower connected to the first section of the upper member.

4. The body according to claim 2, wherein the second direction is such a direction that the first flange and the second flange are displaced inward in the vehicle width direction as the first flange and the second flange get farther away from the connection in the second section.

5. The body according to claim 3, wherein the second direction is such a direction that the first flange and the second flange are displaced inward in the vehicle width direction as the first flange and the second flange get farther away from the connection in the second section.

6. The body according to claim 1, wherein distal ends of the first flange and the second flange in the second section at a side of the first section are provided with a cut.

7. A battery electric vehicle comprising:
the body according to claim 4;
a charging port that is fixed to the body and to which an external charger is detachably connected;
a battery that is fixed to the body and that is charged with electric power supplied from the external charger; and
an electrical cable electrically connecting the charging port and the battery, wherein
the electrical cable is located along the lower wall portion of the upper member from the first section to the second section, and is routed toward an inner side of the vehicle in the second section.

8. A battery electric vehicle comprising:
the body according to claim 1;
a charging port that is fixed to the body and to which an external charger is detachably connected;
a battery that is fixed to the body and that is charged with electric power supplied from the external charger; and
an electrical cable electrically connecting the charging port and the battery, wherein
the electrical cable is located along the lower wall portion of the upper member from the first section to the second section, and is routed toward an inner side of the vehicle in the second section.

* * * * *